(12) United States Patent
Yamafuji

(10) Patent No.: US 7,484,581 B2
(45) Date of Patent: Feb. 3, 2009

(54) VEHICLE WITH HIGH VOLTAGE LINE

(75) Inventor: Takahiro Yamafuji, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 488 days.

(21) Appl. No.: 11/070,187

(22) Filed: Mar. 3, 2005

(65) Prior Publication Data

US 2005/0205316 A1 Sep. 22, 2005

(30) Foreign Application Priority Data

Mar. 16, 2004 (JP) ............................ 2004-073703

(51) Int. Cl.
*B62D 7/22* (2006.01)
(52) U.S. Cl. .................. 180/65.1; 180/220; 180/65.5; 180/65.3; 180/65.6; 180/65.7; 180/68.5
(58) Field of Classification Search .............. 180/65.1, 180/54.1, 6.48, 60, 214, 216, 242, 298, 220, 180/65.5, 65.3, 65.6, 65.7, 68.5
See application file for complete search history.

(56) References Cited

U.S. PATENT DOCUMENTS 3,828,880 A * 8/1974 Smith .......................... 180/306
5,416,595 A * 5/1995 Wield .......................... 348/825
5,524,726 A * 6/1996 Wright, Jr. .................. 180/220
6,460,642 B1 * 10/2002 Hirano ....................... 180/65.1
7,025,160 B2 * 4/2006 Awakawa .................. 180/68.5
7,079,379 B2 * 7/2006 Yamaguchi et al. ......... 361/676
7,144,039 B2 * 12/2006 Kawasaki et al. ........... 280/784

FOREIGN PATENT DOCUMENTS

JP 06-270697 9/1994
JP 2000-152470 5/2000

* cited by examiner

*Primary Examiner*—Cynthia F Collado
(74) *Attorney, Agent, or Firm*—Kenyon & Kenyon LLP

(57) ABSTRACT

As a framework member 50 of a vehicle deforms, a bracket attached to the framework member 50 also deforms. An inverter 20 which is attached to the framework member 50 via a bracket 60 also deforms. Thus, following the deformation of the framework member 50 of the vehicle, the bracket 60 and the inverter 20 deform accordingly to result in a rather small amount of relative deformation among the framework member 50, the bracket 60, and the inverter 20. In addition, a high voltage line 40 attached to the bracket 60 also deforms following the deformation of the bracket 60. Therefore, even in the event of an accident, the high voltage line 40 can be secured in a space reserved between framework member 50 and inverter 20, which significantly reduces the possibility of disconnection of the high voltage line 40.

7 Claims, 2 Drawing Sheets

VEHICLE WITH HIGH VOLTAGE LINE

BACKGROUND OF THE INVENTION

1. Filed of the Invention

The present invention relates to a vehicle which uses a motor as the motive power source, and particularly to a vehicle with high voltage lines.

2. Description of the Related Art

Vehicles driven by a motor have been known, such as an electric vehicle which uses a motor alone as the motive power source and a hybrid vehicle which uses both a motor and an engine as the motive power source. In both electric vehicles and hybrid vehicles, a motor is connected to an inverter which is, in turn, connected to a high voltage battery. In other words, such vehicles are made to run by feeding electric power to the inverter from the high voltage battery and supplying a drive signal from the inverter to the motor in response to the running status of the vehicle, with a high voltage line connecting the inverter to the high voltage battery.

In the event of a vehicular accident, there is a possibility that such a high voltage line may become a voltage hazard and cause electrocution. For example, it can be anticipated that, in the event of a car crash, the connection between the high voltage line and the inverter may be broken so that a high voltage is applied to the body of the vehicle, and, if someone touches the body of that vehicle, he or she may be electrocuted or suffer an electric shock. In consideration of this danger, various techniques have been proposed to prevent electric shock from a high voltage line of the vehicle.

For example, Japanese patent laid-open application No. 2000-152470 proposes a technique in which the length of the high voltage line is made longer than the distance between terminals, such that an excess length of the line runs around along the driving axis and the roundabout part is fixedly attached temporarily with a clip. Thus, in the event of an accident, the excess length of the high voltage line is released from the clip and made free to extend, thereby preventing disjoining of the high voltage line from the terminals.

In addition to separation of the high voltage line from the terminals, an electric shock may also occur because of the disconnection of the high voltage line itself. For example, the high voltage line may be sandwiched and disconnected between the inverter and the framework of the vehicle, and the disconnected part may contact the framework to create an electric shock hazard.

SUMMARY OF THE INVENTION

The present invention advantageously prevents the disconnection of a high voltage line.

To accomplish the above object, a vehicle according to a preferred embodiment of the present invention includes a high voltage unit for supplying a drive signal to a motor, and a high voltage line connected to the high voltage unit, the high voltage unit being attached to a framework member of the vehicle by a fastening member and the high voltage line being attached by the same fastening member.

In this structure, the framework member and the fastening member are made by a rigid material, such as a metal. According to this structure, the high voltage line is attached to the high voltage unit by the same fastening member as used for attaching the high voltage unit. Therefore, when the framework member is deformed due to the car crash and the high voltage unit is deformed accordingly, the high voltage line is moved to follow the deformation of the framework member and the displacement of the high voltage unit. Thus, it is possible to prevent the high voltage line from being sandwiched between the high voltage unit and the framework member. In other words, the disconnection of the high voltage line can be avoided.

Preferably, the high voltage unit is attached to the framework member located forward of the high voltage unit in the engine room provided in the front part of the vehicle, while the high voltage line extends from the joint of the fastening member towards the rear part of the vehicle in a direction the vehicle travels. Further preferably, the high voltage line electrically connects the high voltage unit to a battery via a relay which shuts down the electrical connection at the time of car crash. Further preferably, the high voltage line electrically connects the high voltage unit to a motor. Still further preferably, the high voltage unit electrically connects the high voltage unit to a compressor of an air conditioner.

In accordance with the present invention, it is possible to prevent the disconnection of the high voltage line.

DESCRIPTION OF THE PREFERRED EMBODIMENT

A preferred embodiment of the present invention will be described below with reference to the attached drawings.

Figure 1:
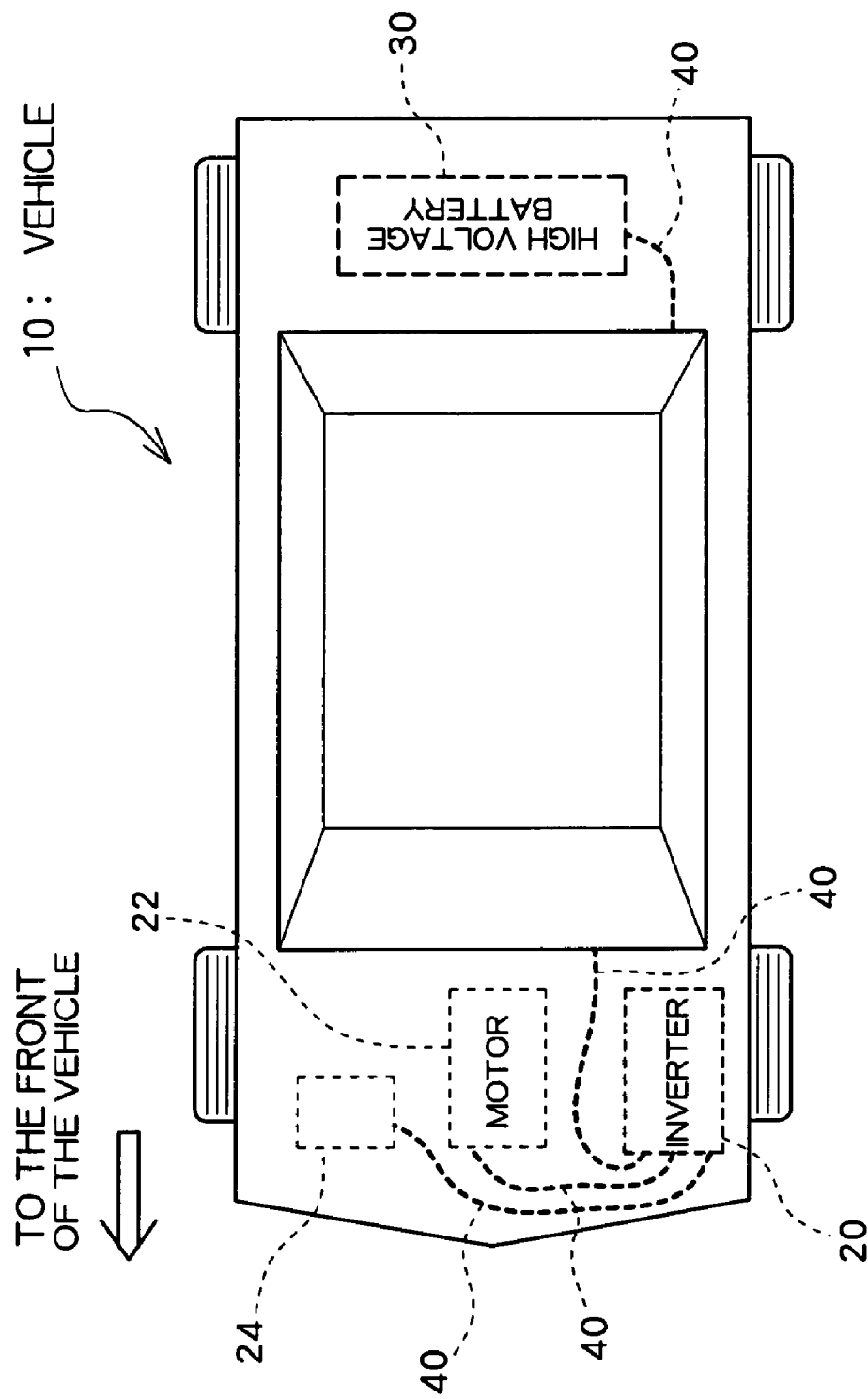
FIG. 1 is an overall schematic view of a vehicle according to the present invention.

FIG. 1 is an overall schematic view of a preferred embodiment according to the present invention.

A vehicle 10 utilizes a motor 22 as the motive power source. For example, the vehicle 10 may be an electric vehicle driven by the motor 22, or a hybrid vehicle driven by the motor 22 together with an engine which is not shown. The vehicle 10 includes a high voltage battery 30 which stores electric power to drive the motor, and an inverter 20 which supplies drive signals to the motor 22, and a high voltage line 40 which transmits electric power to the inverter 20 from the high voltage battery 30. The inverter 20 is arranged in an engine room (engine compartment) which is located in the front part of the vehicle. It is noted that the engine is not always provided in the engine room, as the electric vehicle does not require the engine for the motive power use.

The high voltage battery 30 is provided at the rear of the vehicle. The high voltage line 40 extends from the connection terminal of the inverter 20 towards the connection terminal of the high voltage 30 in a direction the vehicle travels. The high voltage line 40 also runs between the inverter 20 and the motor 22 that is driven by the inverter 20, and between the inverter 20 and another element such as a compressor 24 of an air conditioner. It should be understood that FIG. 1 is a schematic view for the purpose of explaining the use of the high voltage line 40 within the vehicle 10, therefore, the connection (or attachment) of the high voltage line 40 especially at the joint of the inverter 20 is simplified. The connection between the high voltage line 40 and the inverter 20 will be described more in detail later with reference to FIG. 2. In this embodiment, disconnection of these high voltage lines 40 is prevented in the event of an accident involving the vehicle 10, thereby reducing the possibility of electrical leakage or hazards.

Figure 2A:
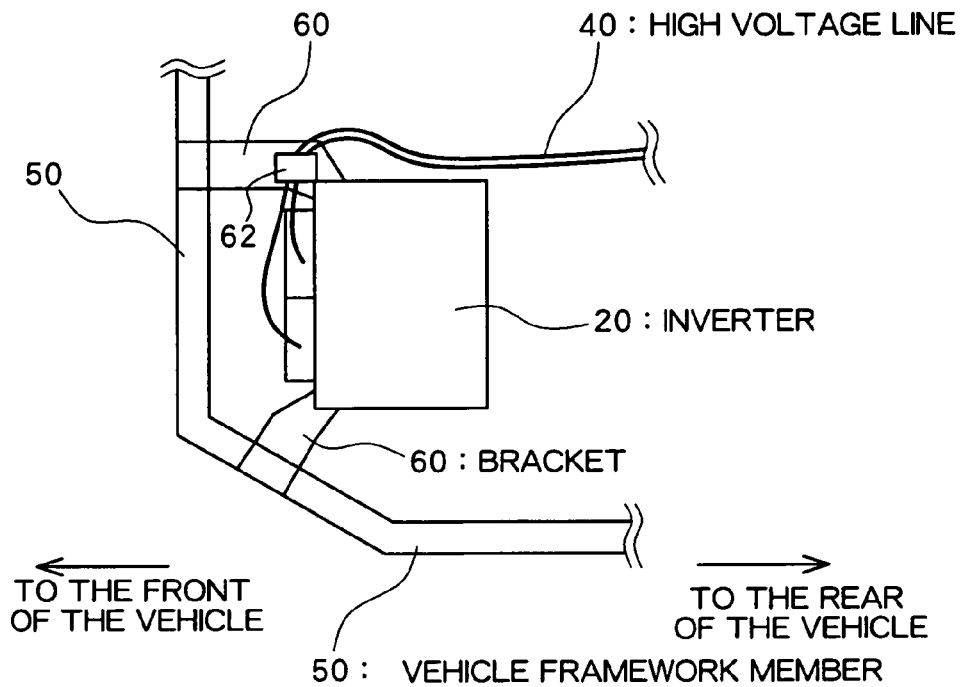
FIG. 2 is a drawing explaining the principle of disconnection prevention according to an embodiment of the present invention.
Figure 2B:
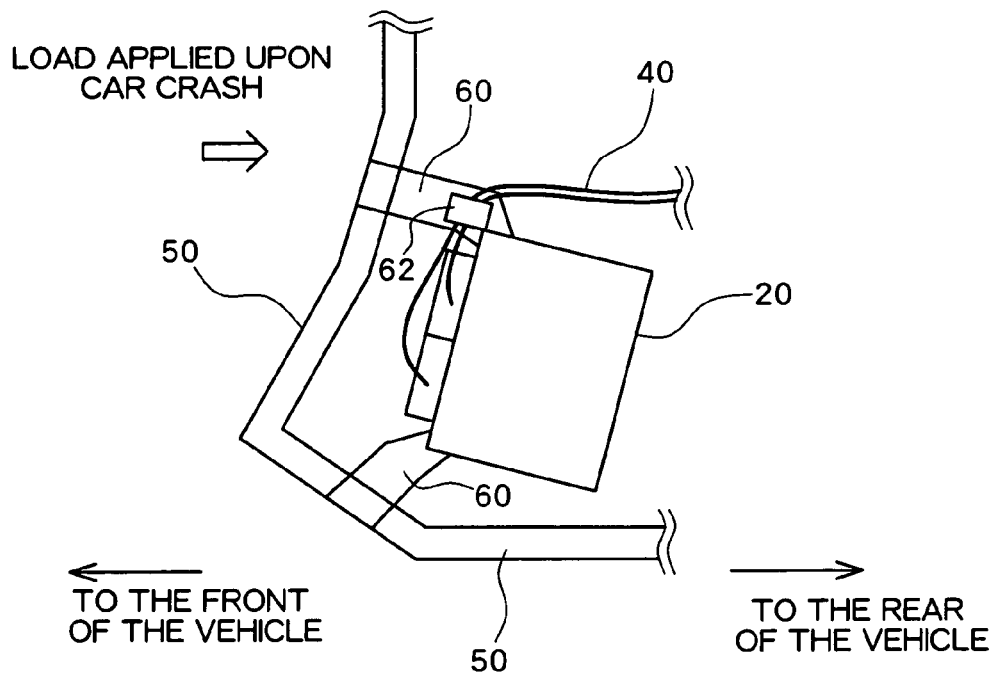

FIG. 2 explains the principle of preventing disconnection according to this embodiment, showing an enlarged view of part of the vehicle 10 surrounding the inverter 20. FIG. 2(A) shows the normal condition, while FIG. 2(B) shows a condition after an accident, exemplified here as a car crash. Numerals the same as those in FIG. 1 indicate corresponding parts.

As shown in FIG. 2(A), the inverter 20 is attached to a framework member 50 of the vehicle by a bracket 60. The framework member 50 of the vehicle literally forms the "frame" of the vehicle, and is made by a sufficiently rigid material, such as a metal. The bracket 60 is also formed by a rigid enough material such as a metal as in the framework member, and serves to securely attach the inverter 20 to the framework member 50.

The high voltage line 40 is connected at one end to the framework member 50 of the vehicle, while the other end which is not shown is connected to the high voltage battery 30, the motor 22, or the compressor 24. The high voltage line 40 connected to the terminal of the inverter 20 is attached by the bracket 60 and extends from the joint of the inverter 20 along the side of the inverter 20 (or above the inverter 20 in FIG. 2) towards the rear part of the vehicle in a direction the vehicle travels.

When the vehicle 20 of this embodiment is involved in a front end crash, a load of crash is applied in the direction of an arrow shown in FIG. 2(B). If a major crash occurs and a significant load is applied, the framework member 50 of the vehicle cannot endure that load and deforms towards the rear part of the vehicle. As the framework member of the vehicle 50 deforms, the bracket 60 attached thereto may also deforms. The inverter 20 attached to the framework member 50 via the bracket 60 also deforms following the deformation of the bracket 60. In other words, following the deformation of the framework member 50 of the vehicle, the bracket 60 and the inverter 20 also deform to provide a small amount of relative deformation among the framework member 50, the bracket 60, and the inverter 20. For example, when FIGS. 2(A) and 2(B) are compared, it is shown that the distance between the framework member 50 and the inverter 20 remains approximately the same before and after the crash.

In this embodiment, the high voltage line 40 attached to the bracket 60 also deforms following the deformation of the bracket 60. Thus, as shown in FIG. 2(B), the high voltage line 40 is allowed to remain in the space reserved between the framework member 50 and the inverter after the car crash, which significantly reduces the possibility of disconnection of the high voltage line 40 sandwiched between the framework member 50 and the inverter 20.

In the case where the high voltage line 40 extends towards the trunk room provided in the rear part of the vehicle, starting from the joint 62 of the bracket 60, it is preferable that the high voltage line 40 runs so as not to be sandwiched between rigid members until the line 40 reaches in the vicinity of the dashboard panel. In other words, it is preferable to not arrange rigid members either in front or rear of the high voltage line 40 in the vehicle. It is also possible to further reduce the possibility of leakage by providing a relay between the high voltage battery 30 and the high voltage line 40 to shut down the electrical connection when the car crash occurs.

In this embodiment, the space between the framework member 50 and the inverter 20 can be secured even after a car crash. This prevents an unnecessary increase in the distance between the framework member 50 and the inverter 20, which may increase the degree of freedom of design of the vehicle. This is also advantageous in terms of manufacturing costs in that disconnection of the high voltage line 40 can be prevented without providing specific countermeasures, such as a protective sleeve.

The preferred embodiment of the present invention has been described above using a specific example. It should be understood, however, that the particular embodiment described above is merely an illustration and is not intended to limit the scope of the present invention.

What is claimed is:

1. A vehicle, comprising:
a high voltage unit for supplying a drive signal to a motor, and
a high voltage line coupled to the high voltage unit,
wherein the high voltage unit is attached to a framework member of the vehicle by directly attaching the high voltage unit to a fastening member attached directly to the framework member of the vehicle and the high voltage line is also attached by the same fastening member, and
wherein the high voltage unit is attached to the framework member located forward of the high voltage unit in an engine room provided in the front part of the vehicle, and the high voltage line extends towards the rear part of the vehicle in a direction the vehicle travels from the joint of the fastening member.

2. A vehicle, comprising:
a high voltage unit for supplying a drive signal to a motor, and
a high voltage line coupled to the high voltage unit,
wherein the high voltage unit is attached to a framework member of the vehicle by directly attaching the high voltage unit to a fastening member attached directly to the framework member of the vehicle and the high voltage line is also attached by the same fastening member, and
wherein the high voltage line electrically connects the high voltage unit to a battery via a relay which shuts down the electrical connection when a car crash occurs.

3. A vehicle, comprising:
a high voltage unit for supplying a drive signal to a motor, and
a high voltage line coupled to the high voltage unit,
wherein the high voltage unit is attached to a framework member of the vehicle by directly attaching the high voltage unit to a fastening member attached directly to the framework member of the vehicle and the high voltage line is also attached by the same fastening member,
wherein the high voltage unit is attached to the framework member located forward of the high voltage unit in an engine room provided in the front part of the vehicle, and the high voltage line extends towards the rear part of the vehicle in a direction the vehicle travels from the joint of the fastening member, and
wherein the high voltage line electrically connects the high voltage unit to a battery via a relay which shuts down the electrical connection when a car crash occurs.

4. A vehicle, comprising
an inverter for supplying a drive signal to a motor, and
a high voltage line coupled to the inverter,
wherein the inverter is attached to a framework member of the vehicle by directly attaching the inverter to a bracket attached directly to the framework of the vehicle and the high voltage line is also attached by the same bracket,
wherein the inverter is attached to the framework member located forward of the inverter in an engine room provided in the front part of the vehicle, and
the high voltage line extends towards the rear part of the vehicle in a direction the vehicle travels from the joint of the bracket.

5. A vehicle, comprising
an inverter for supplying a drive signal to a motor, and
a high voltage line coupled to the inverter,
wherein the inverter is attached to a framework member of the vehicle by directly attaching the inverter to a bracket attached directly to the framework of the vehicle and the high voltage line is also attached by the same bracket,
wherein the high voltage line electrically connects the inverter to a battery via a relay which shuts down the electrical connection when a car crash occurs.

6. A vehicle, comprising
an inverter for supplying a drive signal to a motor, and
a high voltage line coupled to the inverter,
wherein the inverter is attached to a framework member of the vehicle by directly attaching the inverter to a bracket attached directly to the framework of the vehicle and the high voltage line is also attached by the same bracket,
wherein the high voltage line is coupled at one end to the inverter in a space reserved between the framework member and the inverter.

7. A vehicle, comprising
an inverter for supplying a drive signal to a motor, and
a high voltage line coupled to the inverter,
wherein the inverter is attached to a framework member of the vehicle by directly attaching the inverter to a bracket attached directly to the framework of the vehicle and the high voltage line is also attached by the same bracket,
wherein when the framework member is deformed at the time of a car crash, the bracket is displaced to follow the deformation, and the inverter is displaced to follow the displacement of the bracket in such a manner that a distant between the framework member and the inverter remains approximately the same before and after the crash.

* * * * *

UNITED STATES PATENT AND TRADEMARK OFFICE
CERTIFICATE OF CORRECTION

PATENT NO. : 7,484,581 B2 Page 1 of 1
APPLICATION NO. : 11/070187
DATED : February 3, 2009
INVENTOR(S) : Takahiro Yamafuji It is certified that error appears in the above-identified patent and that said Letters Patent is hereby corrected as shown below:

| Column | Line | |
|---|---|---|
| 3 | 28 | Change "deforms" to --deform--. |
| 6, claim 7 | 14 | Change "distant" to --distance--. |

Signed and Sealed this

Fourth Day of August, 2009

JOHN DOLL
*Acting Director of the United States Patent and Trademark Office*